US010794737B2

(12) United States Patent
Pusheck

(10) Patent No.: US 10,794,737 B2
(45) Date of Patent: Oct. 6, 2020

(54) SLIDE LOCKING SENSOR MOUNTING

(71) Applicant: Autoliv ASP, Inc., Ogden, UT (US)

(72) Inventor: Jacob Pusheck, Waterford, MI (US)

(73) Assignee: VEONEER US, INC., Southfield, MI (US)

( * ) Notice: Subject to any disclaimer, the term of this patent is extended or adjusted under 35 U.S.C. 154(b) by 166 days.

(21) Appl. No.: 15/788,790

(22) Filed: Oct. 19, 2017

(65) Prior Publication Data

US 2019/0120670 A1  Apr. 25, 2019

(51) Int. Cl.
*G01D 11/30* (2006.01)
*G01L 19/14* (2006.01)

(52) U.S. Cl.
CPC ............ *G01D 11/30* (2013.01); *G01L 19/147* (2013.01)

(58) Field of Classification Search
CPC ........ G01P 1/023; H05K 5/0078; G01D 11/30
USPC ....................................................... 73/866.5
See application file for complete search history.

(56) References Cited

U.S. PATENT DOCUMENTS

| 2007/0267941 | A1 | 11/2007 | Eidel et al. |
| 2009/0293629 | A1 | 12/2009 | Henzler et al. |
| 2010/0263444 | A1 | 10/2010 | Karmazyn |
| 2012/0000291 | A1 | 1/2012 | Christoph et al. |
| 2012/0036707 | A1 | 2/2012 | Ludwig |
| 2015/0258953 | A1 | 9/2015 | Murray, Jr. et al. |
| 2016/0061682 | A1 | 3/2016 | Ramsay |
| 2016/0139168 | A1 | 5/2016 | Ludwig et al. |

OTHER PUBLICATIONS

International Search Report, International Application No. PCT/US2018/056261, dated Dec. 20, 2018, 3 pgs.

*Primary Examiner* — Daniel S Larkin
(74) *Attorney, Agent, or Firm* — Dickinson Wright PLLC

(57) ABSTRACT

A mountable sensor assembly for mounting on the sheet metal of a vehicle assembly. The sheet metal may have an opening for mounting the mountable sensor assembly. The mountable sensor assembly may include a sensor circuit and a sensor housing assembly. The sensor housing assembly may include a first portion with a cavity that receives the sensor circuit and a second portion that slideably interacts with the first portion to lock the sensor housing into the opening in the sheet metal.

20 Claims, 14 Drawing Sheets

SLIDE LOCKING SENSOR MOUNTING

BACKGROUND

The present application relates generally to a sensor assembly that can be mounted by linearly sliding one portion of the housing relative to another portion.

BRIEF SUMMARY

In satisfying the above need, as well as overcoming the enumerated drawbacks and other limitations of the related art, the present application provides a sensor assembly that can be mounted by linearly sliding one portion of the housing relative to another portion.

Accordingly, a mountable sensor assembly for mounting on the sheet metal of a vehicle assembly is provided. The sheet metal may have an opening for mounting the mountable sensor assembly. The mountable sensor assembly may include a sensor circuit and a sensor housing assembly. The sensor housing assembly may include a first portion with a cavity that receives the sensor circuit and a second portion that slideably interacts with the first portion to lock the sensor housing into the opening in the sheet metal.

Further objects, features and advantages of this application will become readily apparent to persons skilled in the art after a review of the following description, with reference to the drawings and claims that are appended to and form a part of this specification.

BRIEF DESCRIPTION OF THE DRAWINGS

In the accompanying drawings the components are not necessarily to scale, emphasis instead being placed upon illustrating the principles of the application. Moreover, like reference numerals designate corresponding parts throughout the views.

DETAILED DESCRIPTION

Figure 1:
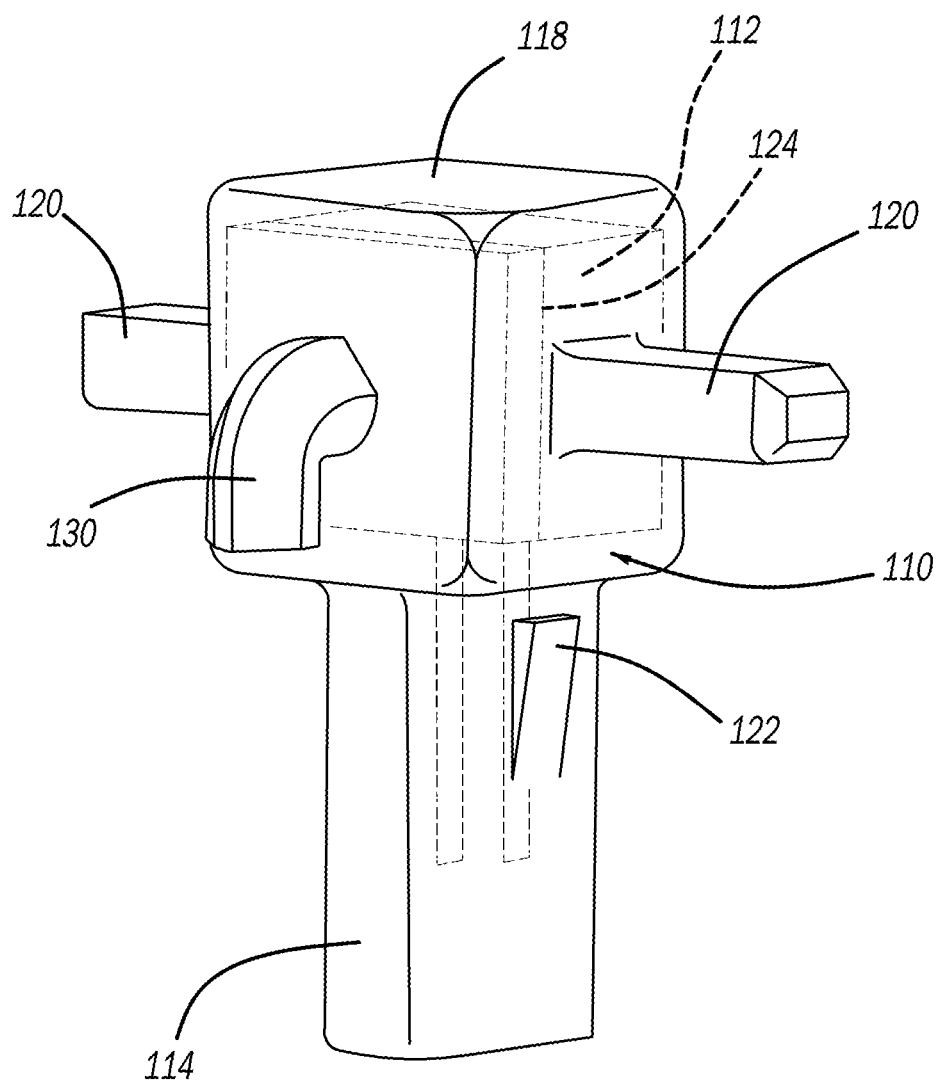
FIG. 1 is a perspective view of a housing for a sensor assembly.

Currently the methods of attachment of an automotive safety grade pressure sensor are by metal fastener and hand installation. Hand installation is by far the preferred method as it allows a single operator, with no help of tools, to install the sensor for final use. This eliminates the cost of metal fasteners as well as reduces the time to install on the assembly line. This combination creates an attractive proposition for OEMs. To reduce the cost and maintain the functionality, the implementations provided attempt to reduce the cost of manufacture for a hand installed device. Current standards specify a specific method of installation as well as a pre-determined sheet metal pattern. This drives both the cost and size of these types of sensors. With the implementations discussed, the sheet metal pattern can be much smaller, the cost can be reduced, and the overall package size can be reduced as well.

The implementations provided in this application allow linear actuation of the two main bodies (relative to each other) to move the connector shield and provide permanent rigid fixing to the vehicle body. The guiding features allow for controlled and permanent or semi-permanent locking of the two components relative to each other. This feature also includes a method of initial attachment of the two bodies, for example before final shipment. A hooked locking feature is provided that doubles as a pressure port by which air pressure changes can be translated from one side of the sheet metal to the other. This hooked feature should always be oriented downward to deter water from making its way up into the sensor cavity of the housing. An initial guiding tab is provided for indexing the sensor to the sheet metal and to also provide retention. This feature both provides resistance vertically by flexing upon installation as well as perpendicular (perpendicular to the sheet metal) resistance by having an extended portion hooked onto the other side of the sheet metal.

Linear actuation is used to actuate the locking mechanisms as well as retraction of a plate to deter electrical connection prior to proper vehicle installation. Guiding features act as a channel to direct the linear actuation, constrain the two pieces to each other during shipment, and retain the sensor assembly to the sheet metal during final installation. The hooked locking feature functions as an orientation post, locking the sensor assembly to the sheet metal, and as a pass through for the pressure signal. The guiding tab provides a means of indexing as well as final installation pull out resistance. The linear motion both locks the sensor in place as well as moving the connector out from the shield upon installation. One purpose of the moveable shield is to ensure that the harness is fitted to the connector only after the assembly has been affixed to the final vehicle body by obscuring at least part of the connector until the sensor assembly is correctly installed to the sheet metal.

Two implementations are described in detail. They differ primarily on their orientation. The initial assembly of the two bodies differs between the two to allow for a more inclusive sealing surface. This sealing surface provides a barrier to environmental damage between the "wet" and "dry" sides of the vehicle's sheet metal. The implementations described provide linear actuated sensor installation with a moveable electrical connection deterrent. Further, they provide a more affordable non-fastener installed pressure sensor design. In this way, it allows for a wider spread use of this fastening type making the business case much more attractive.

FIG. 1 is a perspective view of a housing for a sensor assembly that may be mounted with a linear sliding motion. The sensor assembly may, for example, be the sensor assembly 400 in FIG. 4. The sensor assembly may include a housing 110. The housing 110 may include a cavity 112 for receiving and protecting a sensor 124. The sensor may include a pressure sensor, an accelerometer, a gyroscope, or other sensor. The housing 110 may have a base portion 118 including the cavity. Pins may extend from the cavity within the base portion 118 to a connector 114 configured to connect with a wire harness. The base portion 118 may include assembly arms 120 extending from opposite sides of the base portion 118. The base portion 118 may also include a pressure hook 130 extending from a surface of the base portion 118. The pressure hook 130 may extend at an angle perpendicular to the assembly arms 120. The pressure hook 130 may provide access to the cavity within the housing 110 allowing fluid communication to the sensor. A locking feature 122 of the housing 110 may be located on the connector 114 and may be used to lock the position of orientation of the housing 110 as a shield is slid linearly into a locking position.

Figure 2:
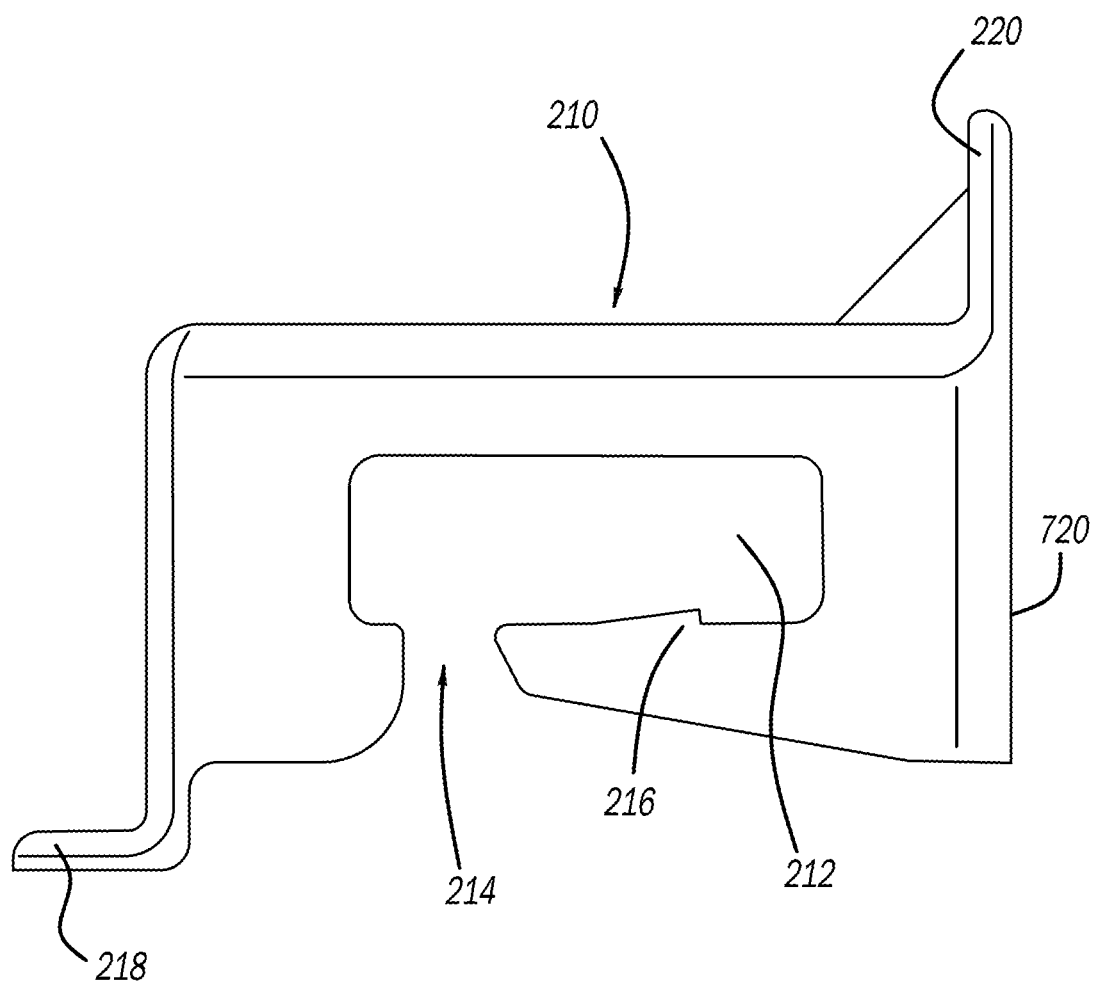
FIG. 2 is a perspective view of a shield for the sensor assembly.

FIG. 2 is a side view of a shield 210 for a sensor assembly that may be mounted with a linear sliding motion. The shield 210 may include a slot 212 configured to receive the assembly arms 120 of the housing 110 through an opening 214. The slot 212 allows the housing 110 to be slid linearly relative to the housing 210 until the assembly arms 120 of the housing 110 engage a locking feature 216 of the slot 212. In addition, the locking feature 122 of the housing may also engage an outer surface of the shield 210 in the fully extended position. The shield 210 may also include a guiding tab 218 that may assist in guiding the shield 210 into an opening in the sheet metal and fixing the position of the assembly against the sheet metal after the housing 110 and shield 210 are slid into an expanded and locked state. Further, a pressing face 220 is provided that extends upward from the shield 210. The pressing face 220 allows the person installing the assembly to pull the assembly arms 120 with their fingers while pushing against the pressing face 220 with their thumb.

While the slot 212 guides the assembly arms 120 as the housing 110 is slid relative to the shield 210, the housing 110 is also enclosed and guided by the three inner surfaces of the shield 210, thereby further constraining the position and orientation of the housing 110 relative to the shield 210. As the housing 110 slides relative to the shield 210, the distance between the guide tab 218 and the pressure hook 130 increases such that the guide tab 218 may engage one edge of an opening in the sheet metal and the pressure hook 130 may engage an opposite side of the opening in the sheet metal. The shape of the opening in the sheet metal may also serve to limit the rotation and/or orientation of the sensor assembly relative to the sheet metal once installed and locked.

Figure 3:
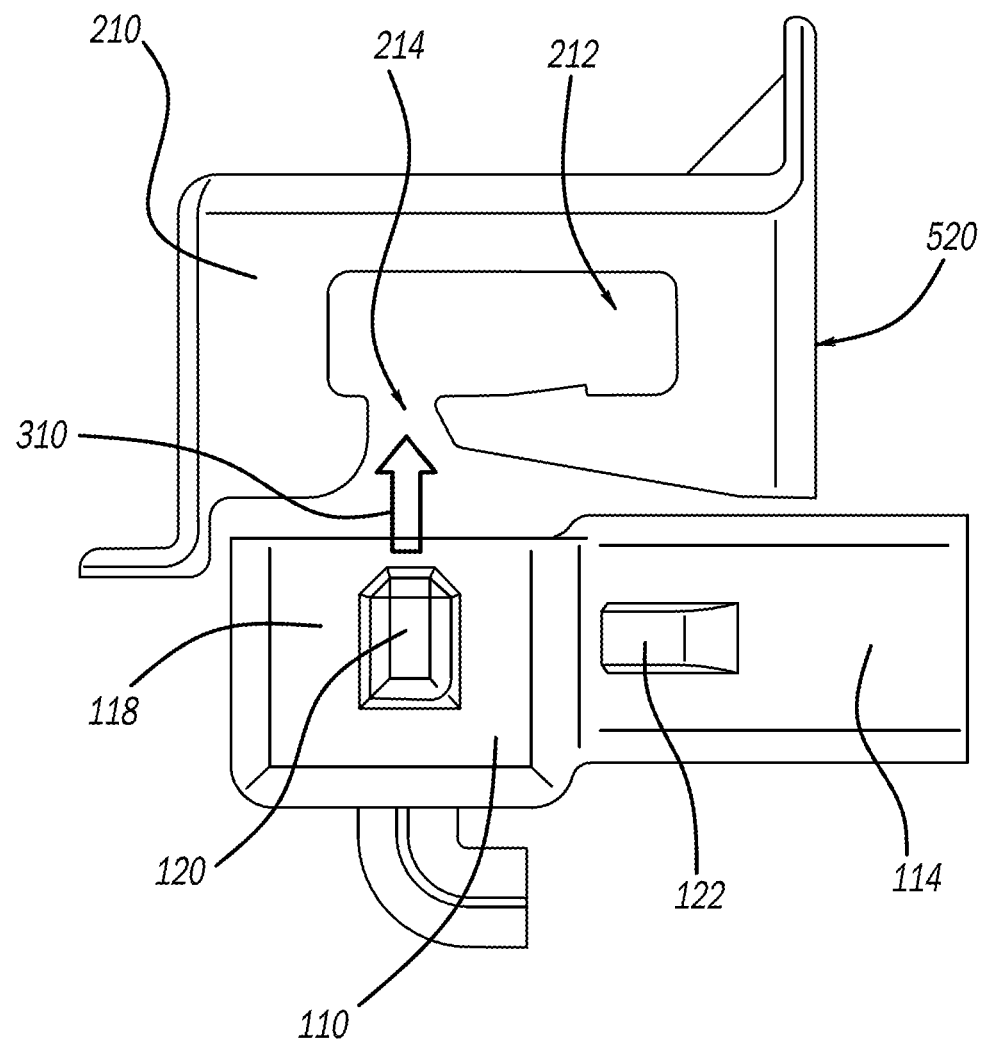
FIG. 3 is a side view of the housing being inserted into the shield.

FIG. 3 is a side view of the housing 110 being inserted into the shield 210 to form a sensor housing assembly. The assembly arms 120 may be aligned with the openings 214 in the slot 212 on each side of the shield 210. The base portion 118 of the housing 110 may be inserted into the shield 210 and may be constrained by the top of the shield as well as both sides of the shield 210. The connector 114 may fit into a connector opening 520 in the front of the shield 210 as the housing 110 is inserted into the bottom portion of the shield as denoted by arrow 310.

Figure 4:
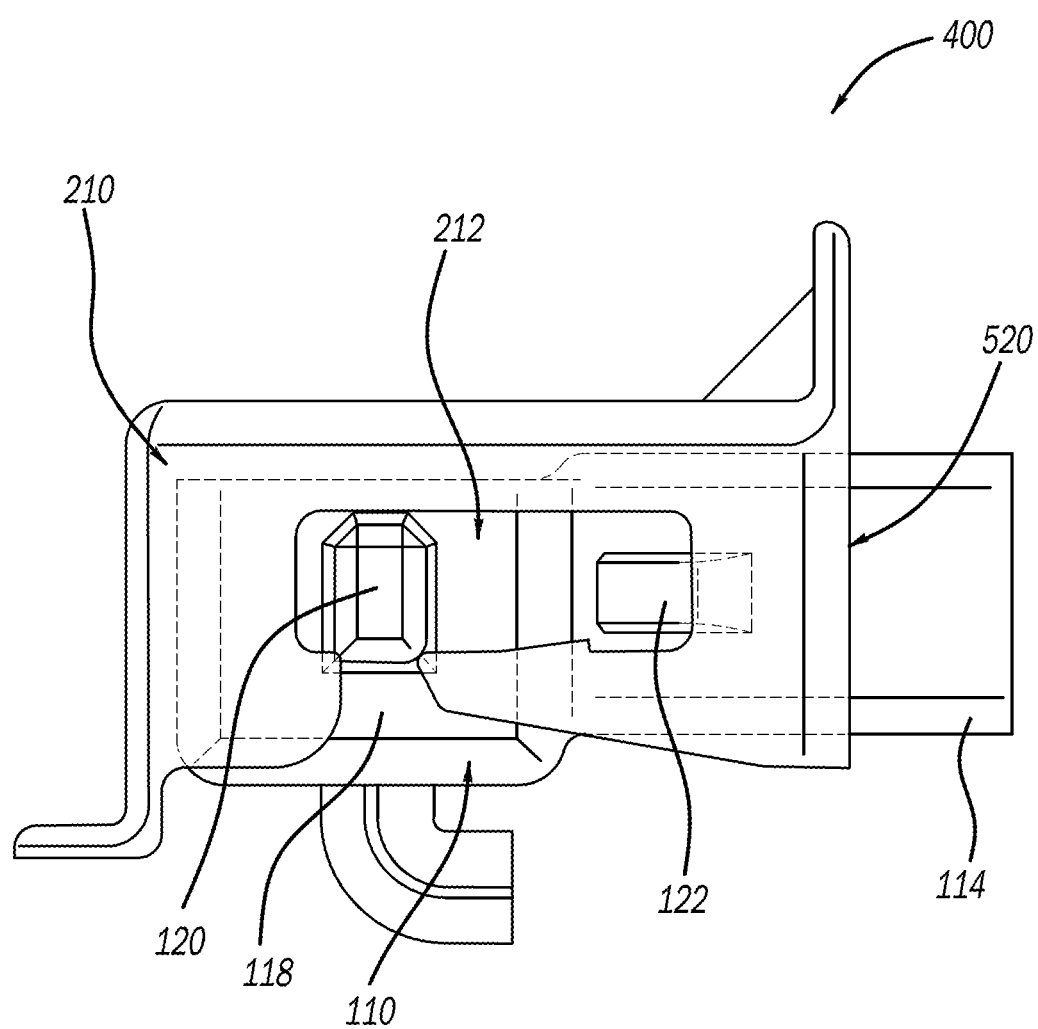
FIG. 4 is a side view with the housing inserted into the shield.

FIG. 4 is a side view with the housing 110 inserted into the shield 210. With the housing 110 fully inserted into the shield 210, the assembly arms 120 extending from the base portion 118 are aligned with the slot 212 such that the housing 110 may be slid linearly relative to the shield 210 along the slot 212. As the housing 110 is slid relative to the shield 210, the connector portion 114 may extend out further through the connector opening 520 in the front of the shield 210.

Figure 5:
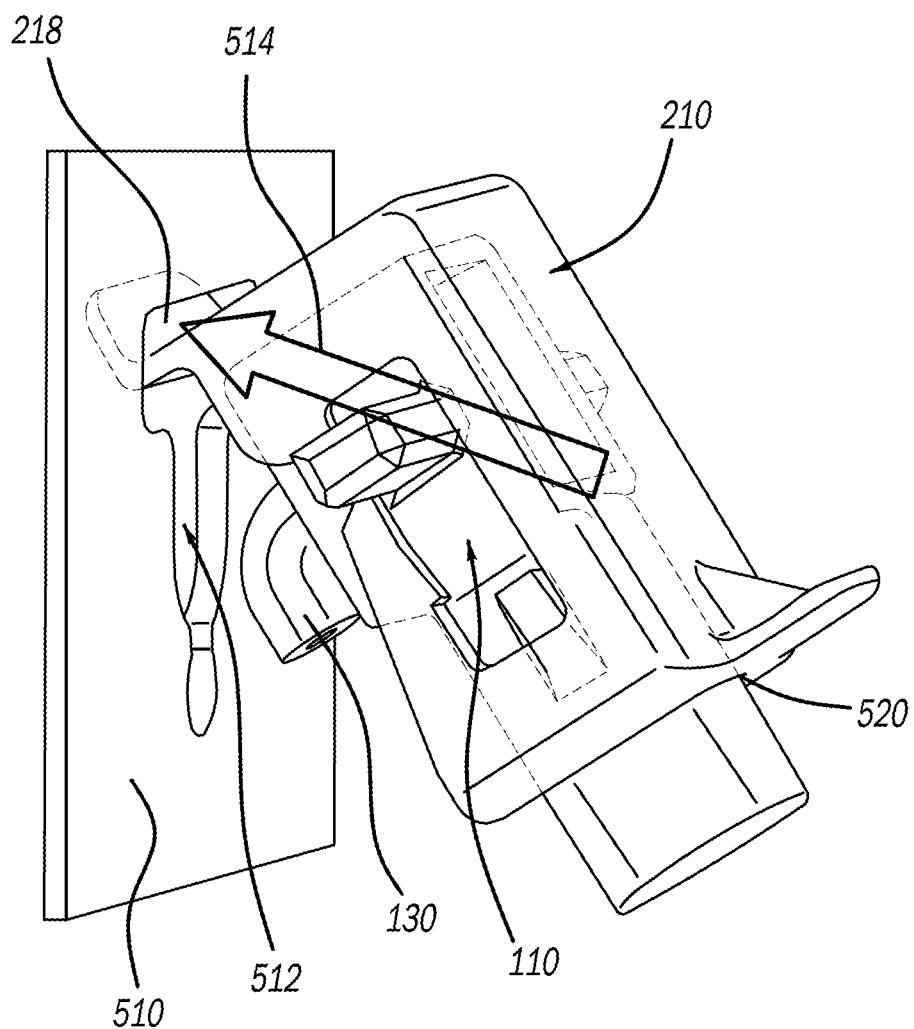
FIG. 5 is a perspective view illustrating the housing and shield combination being inserted into an opening in the sheet metal.

FIG. 5 is a perspective view illustrating the housing 110 and shield 210 combination being inserted into an opening 512 in the sheet metal 510. The opening 512 in the sheet metal 510 may have a key hole shape with a wider portion of the opening on one end and a narrow portion of the opening on an opposite end. Prior to sliding the housing 110 relative to the shield 210, the guiding tab 218 may be inserted into the opening 512 in the sheet metal 510 as illustrated by arrow 514. As the guiding tab 218 is inserted into the opening 512, the pressure hook 130 may also be aligned with the opening 512. For example, the guiding tab 218 may be inserted to engage an edge at a wider portion of the opening and the pressure hook may engage an edge at the narrow portion of the opening.

Figure 6:
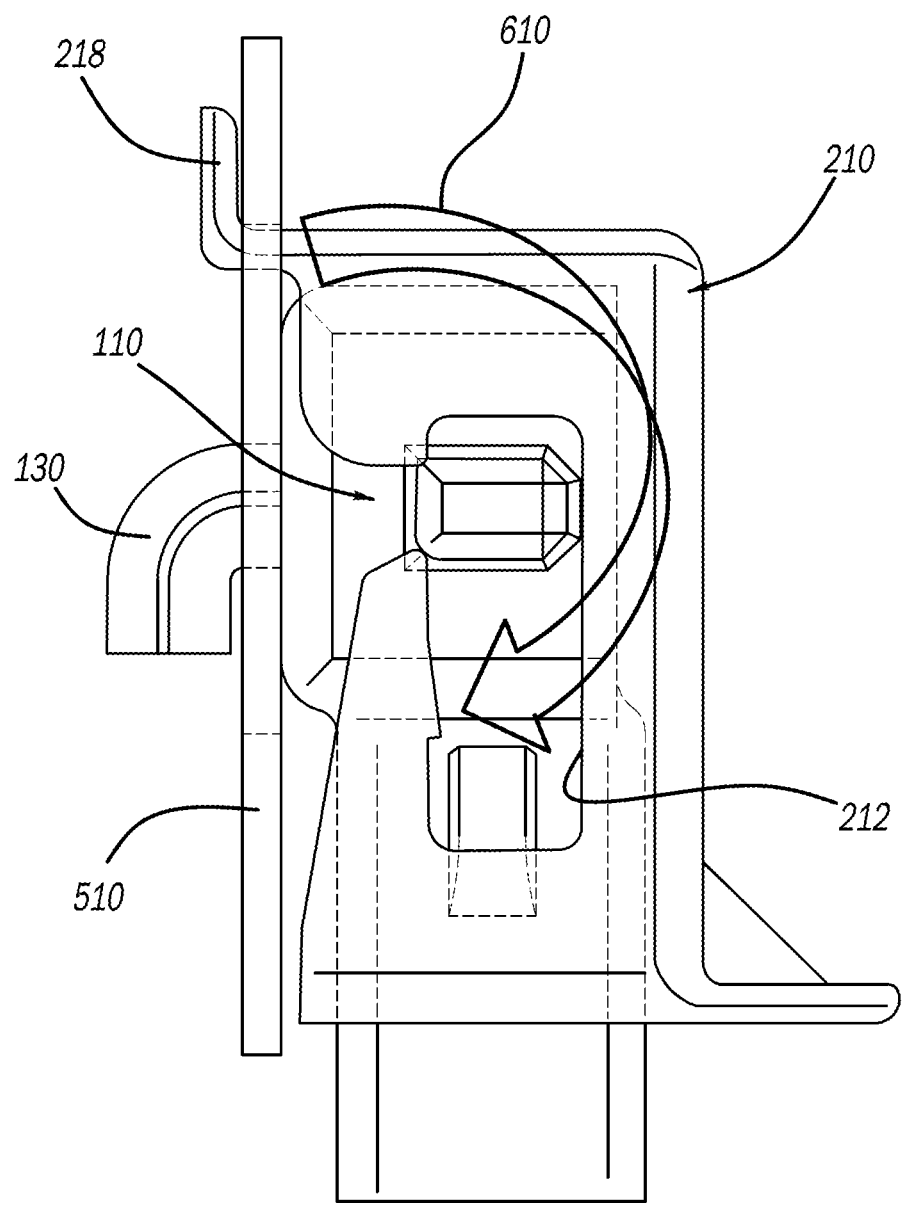
FIG. 6 is a side view illustrating insertion of the housing and shield combination into the opening.

FIG. 6 is a side view illustrating insertion of the housing 110 in shield 210 combination into the opening of the sheet metal. After the guiding tab 218 is inserted and the pressure hook 130 is aligned, the housing 110 and shield 210 combination may be rotated as denoted by arrow 610 such that the pressure hook 130 is inserted into the opening in the sheet metal 510. In this position, the slot 212 may be oriented perpendicular to the sheet metal 510 allowing the housing 110 to be slid relative to the shield 210 in a direction perpendicular to the sheet metal 510.

Figure 7:
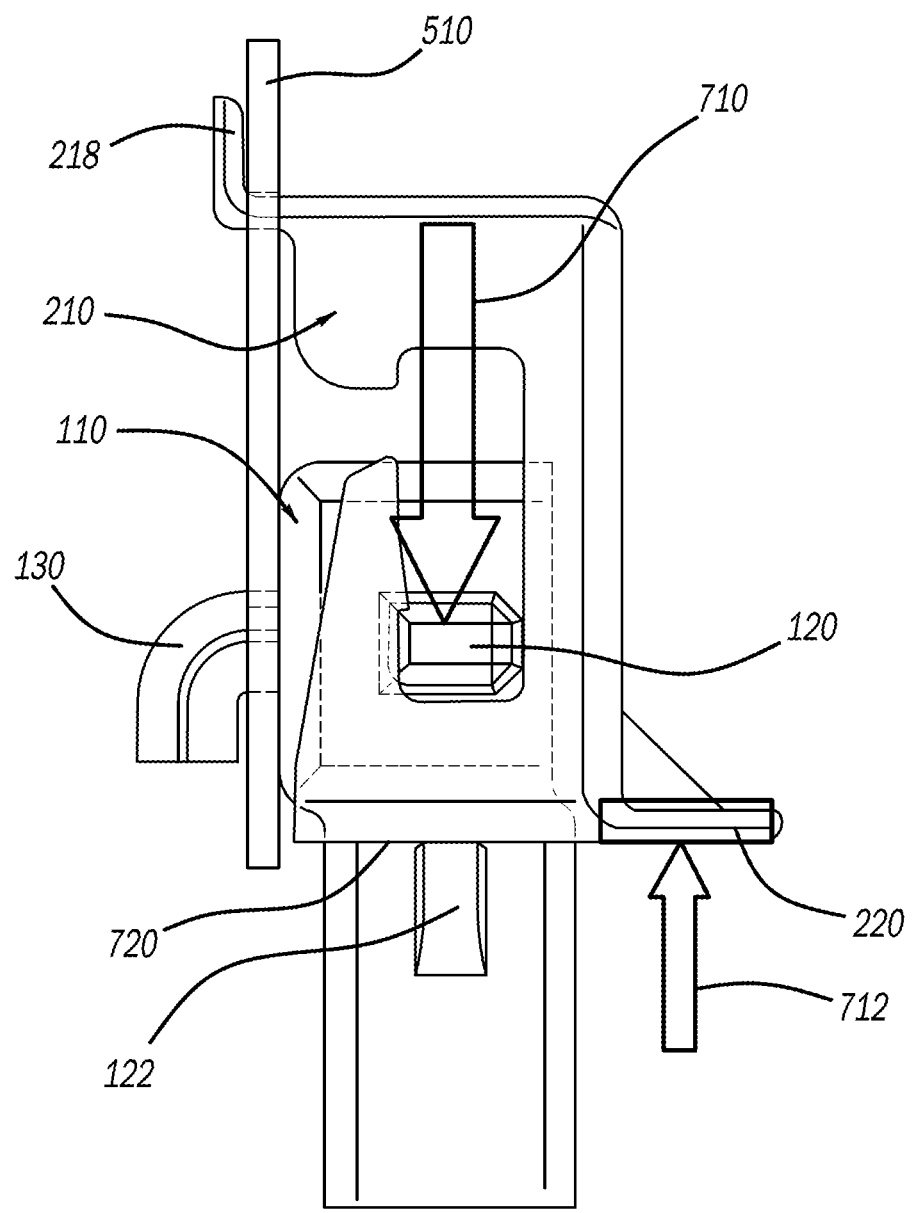
FIG. 7 is a side view of the sensor assembly illustrating the sliding of the housing relative to the shield, locking the sensor assembly to the sheet metal.

FIG. 7 is a side view of the sensor assembly illustrating the sliding of the housing 110 relative to the shield 210. The sliding of the housing 110 relative to the shield 210 may be accomplished by applying a force 710 to the assembly arms 120 and an opposite force 712 to the pressing face 220. For example, once the guiding tab 218 and the pressure hook 130 are inserted into the opening, the person installing the sensor assembly may pull on the assembly arms 120 (downward in FIG. 7) with their index and middle finger while pushing against the pressing face 220 (upward in FIG. 7) with their thumb thereby causing the sliding motion of the housing 110 relative to the shield 210 to expand the distance between the guiding tab 218 and the pressure hook 130. Once the housing 110 is slid completely relative to the shield 210, the assembly lock 122 may engage an outer face 720 of the shield 210 to lock the position of the housing 110 relative to the shield 210. In addition, a locking feature 216 and the slot 212 may also lock against the assembly arms 120 to further fix the position of the housing 110 relative to the shield 210. In this fully expanded and locked position, the guiding tab 218 may engage an inner surface of the opening in the sheet metal 510 and simultaneously the pressure hook 130 may engage an opposite side of the opening in the sheet metal 510 to fix the position and orientation of both the housing 110 and shield 210 relative to the sheet metal 510.

Figure 8:
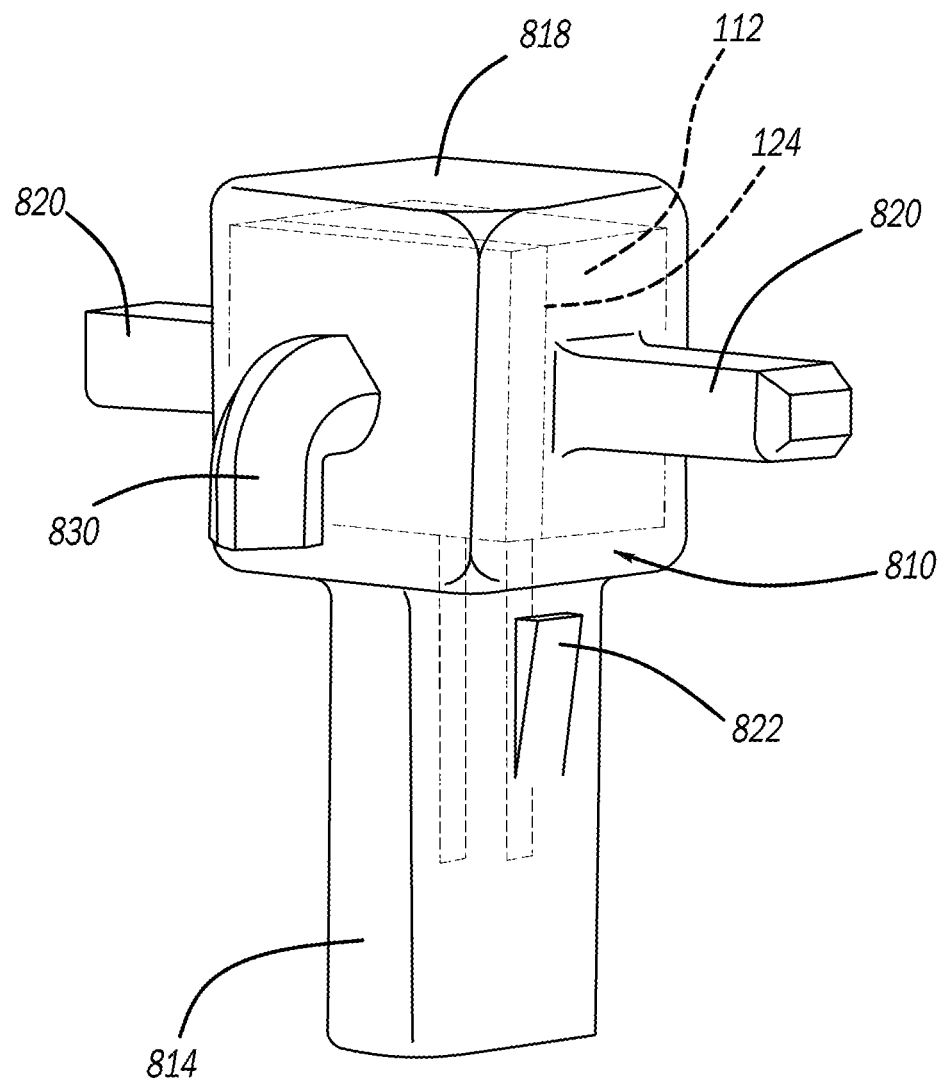
FIG. 8 is a perspective view of housing for another sensor assembly.

FIG. 8 is a perspective view of a housing for another sensor assembly that may be mounted with a linear sliding motion. The sensor assembly may include a housing 810. The housing 810 may include a cavity for receiving and protecting a sensor. The sensor may include a pressure sensor, an accelerometer, a gyroscope, or other sensor. The housing 810 may have a base portion 818 including the cavity. Pins may extend from the cavity within the base portion 818 to a connector 814 configured to connect with a wire harness. The base portion 818 may include assembly arms 820 extending from opposite sides of the base portion 818. The base portion 818 may also include a pressure hook 830 extending from a surface of the base portion 818. The pressure hook 830 may extend at an angle perpendicular to the assembly arms 820. The pressure hook 830 may provide access to the cavity within the housing 810 allowing connection to the sensor. A locking feature 822 of the housing 810 may be located on the connector and may be used to lock the position of orientation of the housing 810 as a shield is slid linearly into a locking position.

Figure 9:
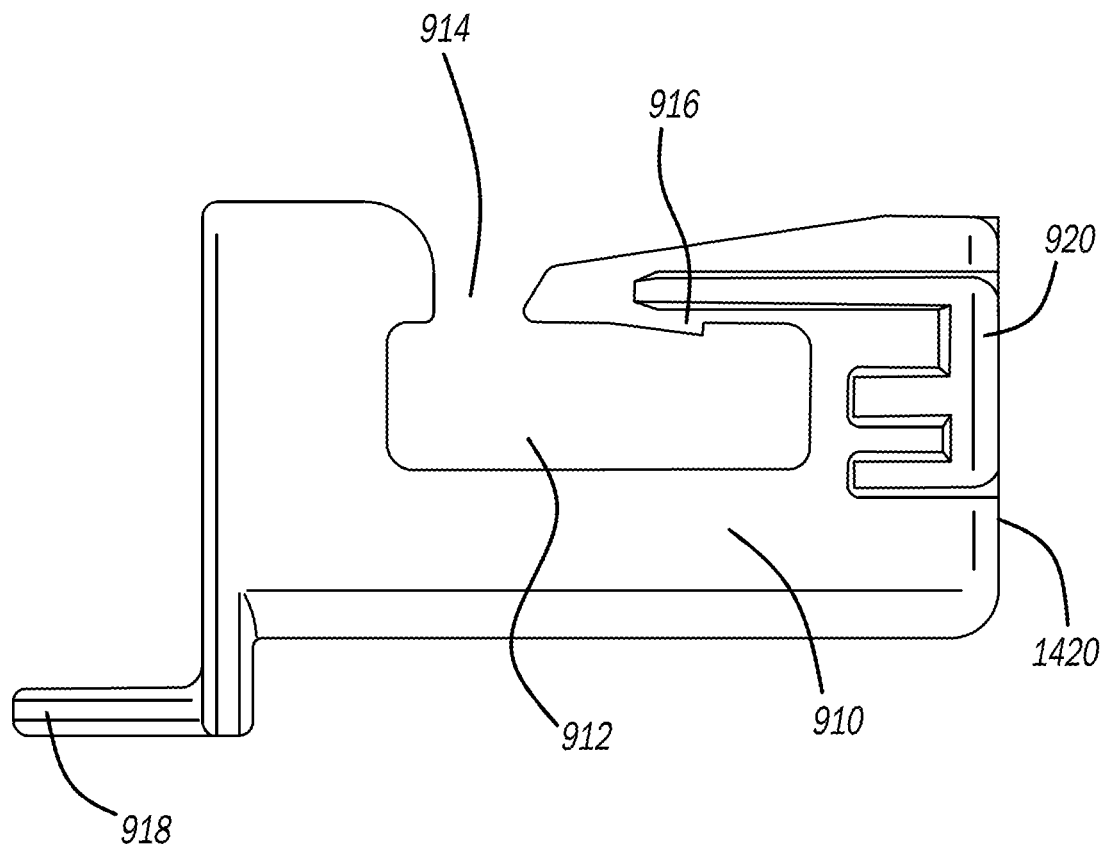
FIG. 9 is a perspective view of a shield for the sensor assembly of FIG. 8.

FIG. 9 is a side view of a shield 910 for a sensor assembly that may be mounted with a linear sliding motion. The shield 910 may include a slot 912 configured to receive the assembly arms 820 of the housing 810 through an opening 914. The slot 912 allows the housing 810 to be slid linearly relative to the housing 910 until the assembly arms 820 of the housing 810 engage a locking feature 916 of the slot 912. In addition, the locking feature 822 of the housing 810 may also engage an outer surface 1420 of the shield 910 in the fully extended position. The shield 910 may also include a guiding tab 918 that may assist in guiding the shield 910 into an opening in the sheet metal and fixing the position of the assembly against the sheet metal after the housing 810 and shield 910 are slid into an expanded and locked state. Further, a pressing face 920 is provided on the shield 920 to the side of the connector opening 1220. The pressing face 920 allows the person installing the assembly to pull the assembly arms 820 with their fingers while pushing against the pressing face 920 with their thumbs. FIG. 9 is a side view of a shield 910 for a sensor assembly that may be mounted with a linear sliding motion. The shield 910 may include a slot 912 configured to receive the assembly arms 820 of the housing 810 through an opening 914. The slot 912 allows the housing 810 to be slid linearly relative to the housing 910 until the assembly arms 820 of the housing 810 engage a locking feature 916 of the slot 912. In addition, the locking feature of the housing 810 may also engage an outer surface 1420 of the shield 910 in the fully extended position. The shield 910 may also include a guiding tab 918 that may assist in guiding the shield 910 into an opening in the sheet metal and fixing the position of the assembly against the sheet metal after the housing 810 and shield 910 are slid into an expanded and locked state. Further, a pressing face 920 is provided on the shield 920 to the side of the connector opening 1220. The pressing face 920 allows the person installing the assembly to pull the assembly arms 820 with their fingers while pushing against the pressing face 920 with their thumbs.

While the slot 912 guides the assembly arms 820 as the housing 810 is slid relative to the shield 910, the housing 810 is also enclosed and guided by the three inner surfaces of the shield 910, thereby further constraining the position and orientation of the housing 810 relative to the shield 910. As the housing 810 slides relative to the shield 910, distance between the guide tab 918 and the pressure hook 830 increases such that the guide tab 918 may engage one edge of an opening in the sheet metal and the pressure hook 830 may engage an opposite side of the opening in the sheet metal. The shape of the opening in the sheet metal may also serve to limit the rotation and/or orientation of the sensor assembly relative to the sheet metal.

Figure 10:
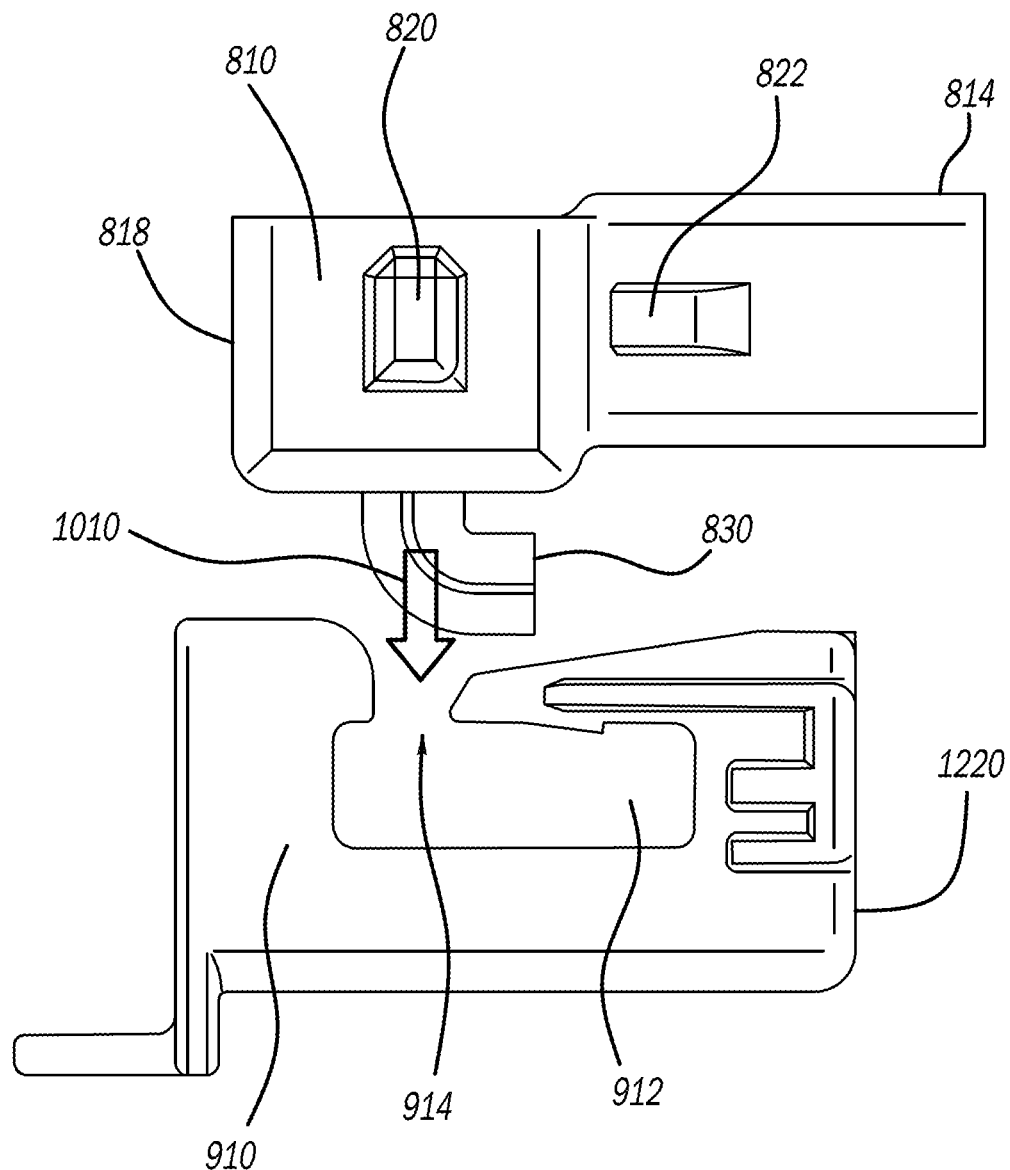
FIG. 10 is a side view of the housing being inserted into the shield.

FIG. 10 is a side view of the housing 810 being inserted into the shield 910 to form a sensor housing assembly. The assembly arms 820 may be aligned with the openings 914 in the slot 912 on each side of the shield 910. The base portion 818 of the housing 810 may be inserted into the shield 910 and may be constrained by the bottom of the shield as well as both sides of the shield 910. The connector 814 may fit into a connector opening 1220 in the front of the shield 910 as the housing 810 is inserted into the top portion of the shield as denoted by arrow 1010. Further, the pressure hook 830 may extend through a pressure hook slot on the bottom side of the shield 910.

Figure 11:
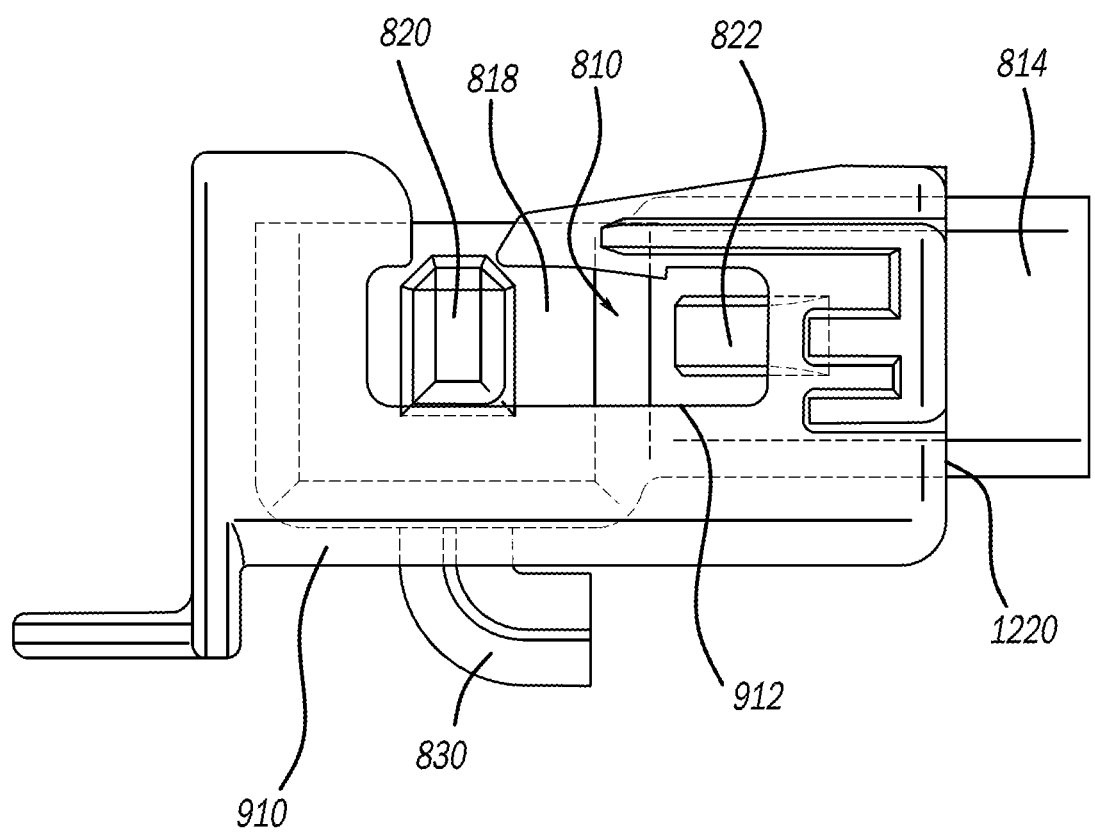
FIG. 11 is a side view with the housing inserted into the shield.

FIG. 11 is a side view with the housing 810 inserted into the shield 910. With the housing 810 fully inserted into the shield 910, the assembly arms 820 extending from the base portion 818 are aligned with the slot 912 such that the housing 810 may be slid linearly relative to the shield 910 along the slot 912. As the housing 810 is slid relative to the shield 910, the connector portion 814 may extend out further through the connector opening 1220 in the front of the shield 910.

Figure 12:
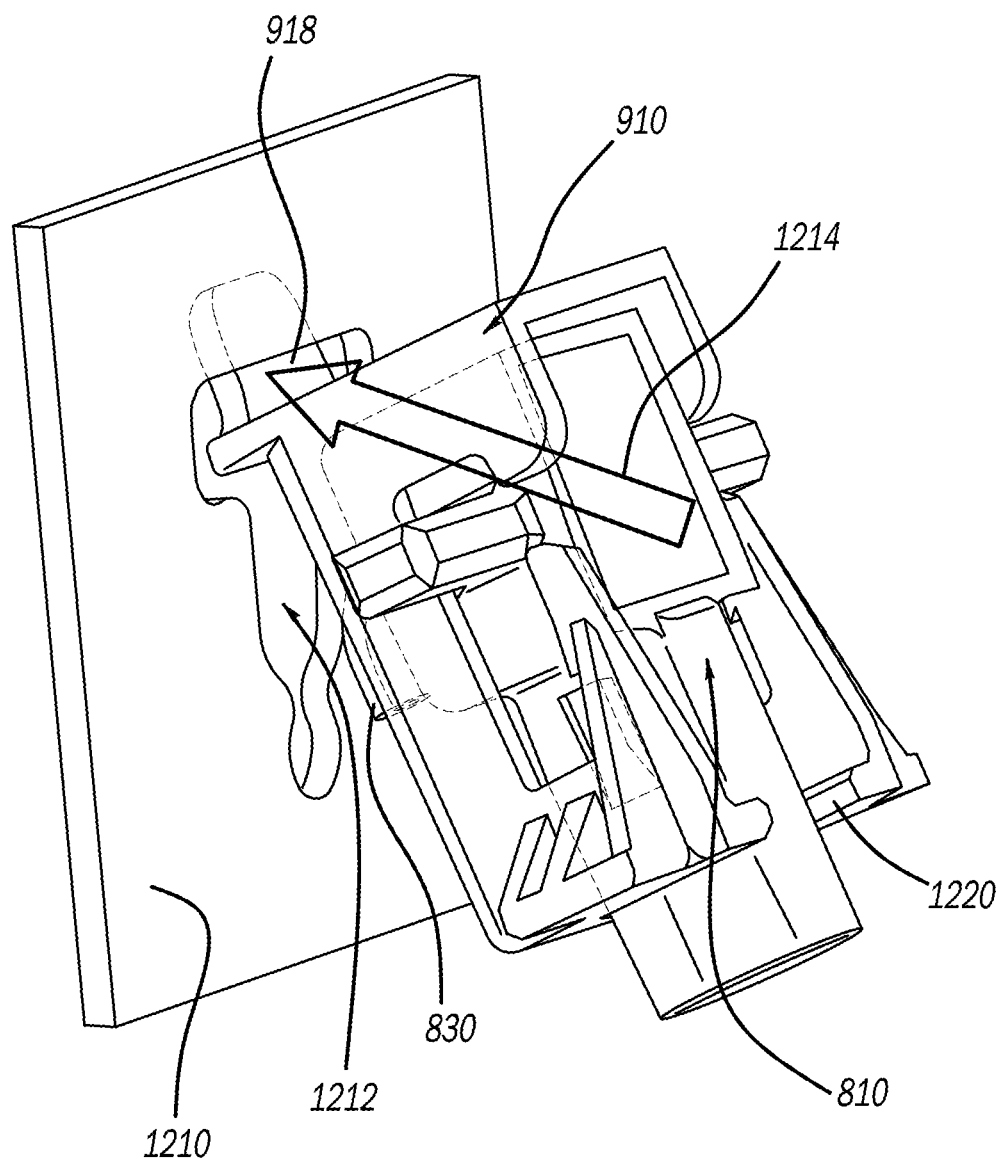
FIG. 12 is a perspective view illustrating the housing and shield combination being inserted into an opening in the sheet metal.

FIG. 12 is a perspective view illustrating the housing 810 and shield 910 combination being inserted into an opening 1212 in the sheet metal 1210. Prior to sliding the housing 810 relative to the shield 910, the guiding tab 918 may be inserted into the opening 1212 in the sheet metal 1210 as illustrated by arrow 1214. As the guiding tab 918 is inserted into the opening 1212, the pressure hook 830 may also be aligned with the opening 1212. In this implementation, the bottom wall of the shield 910 is facing the sheet metal 1210 and the opening in the top of the shield 910 faces away from the sheet metal 1210.

Figure 13:
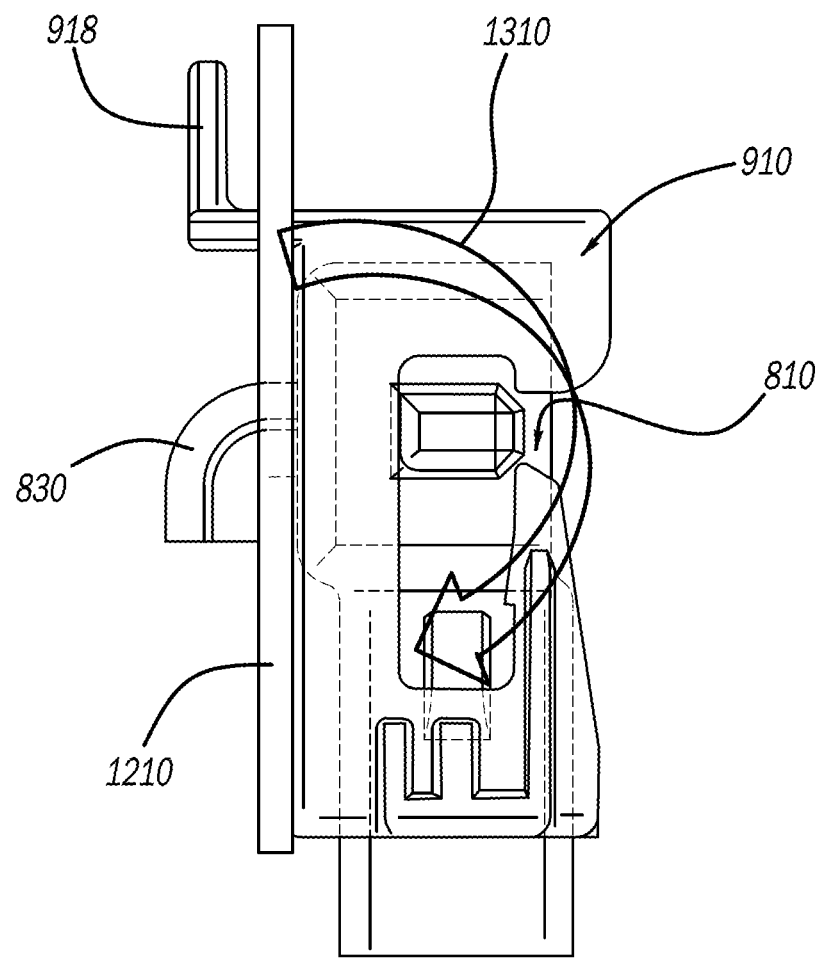
FIG. 13 is a side view illustrating insertion of the housing in shield combination into the opening.

FIG. 13 is a side view illustrating insertion of the housing 810 in shield 910 combination into the opening of the sheet metal. After the guiding tab 918 is inserted and the pressure hook 830 is aligned, the housing 810 and shield 910 combination may be rotated as denoted by arrow 1310 such that the pressure hook 830 is inserted into the opening in the sheet metal 1210. In this position, the slot 912 may be oriented perpendicular to the sheet metal 1210 allowing the housing 810 to be slid relative to the shield 910 in a direction perpendicular to the sheet metal 1210.

Figure 14:
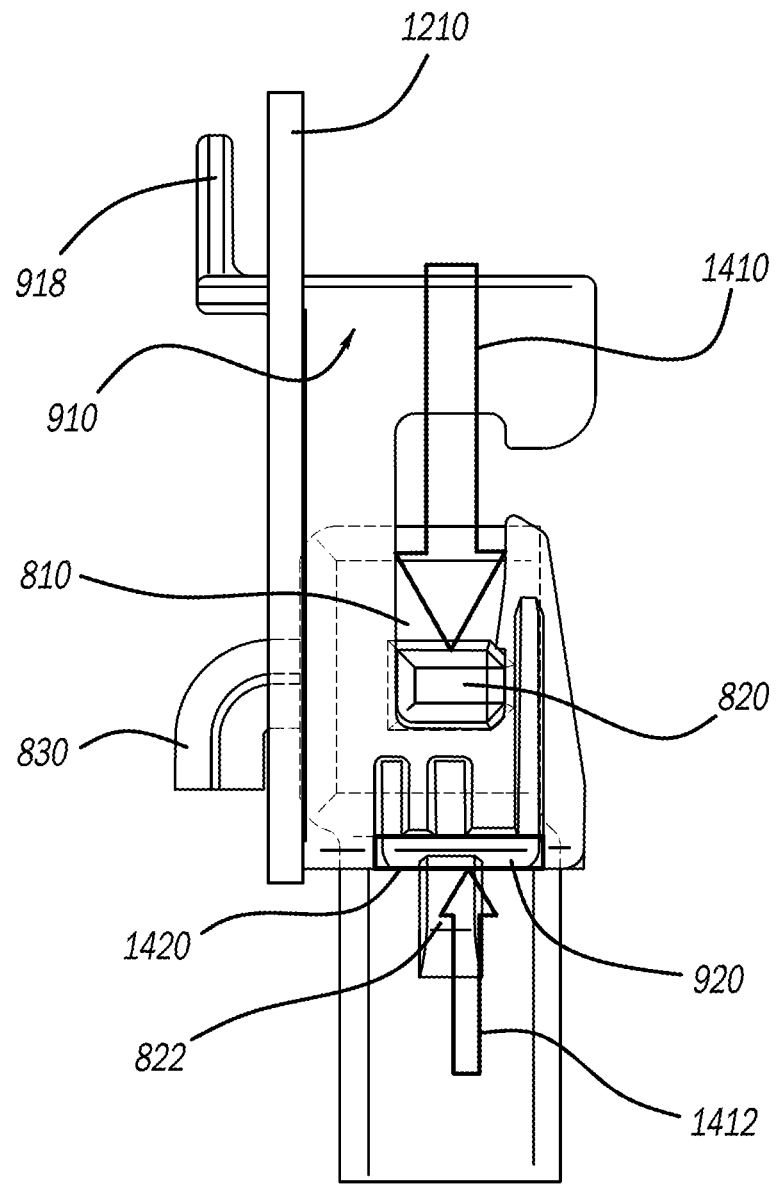
FIG. 14 is a side view of the sensor assembly illustrating the sliding of the housing relative to the shield, locking the sensor assembly to the sheet metal.

FIG. 14 is a side view of the sensor assembly illustrating the sliding of the housing 810 relative to the shield 910. The sliding of the housing 810 relative to the shield 910 may be accomplished by applying a force 1410 to the assembly arms 820 and an opposite force 1412 to the pressing face 920. For example, once the guiding tab 918 and the pressure hook 830 are inserted into the opening, the person installing the sensor may pull forward on the assembly arms 820 with their fingers while pushing against the pressing face 920 with their thumbs thereby causing the sliding motion of the housing 810 relative to the shield 910 to expand the distance between the guiding tab 918 and the pressure hook 830. Once the housing 810 is slid completely relative to the shield 910, the assembly lock 822 may engage an outer face 1420 of the shield 910 to lock the position of the housing 810 relative to the shield 910. In addition, a locking feature 916 and the slot 912 may also lock against the assembly arms 820 to further fix the position of the housing 810 relative to the shield 910. In this fully expanded and locked position, the guiding tab 918 may engage an inner surface of the opening in the sheet metal 1210 and simultaneously the pressure hook 830 may engage an opposite side of the opening in the sheet metal 1210 to fix the position and orientation of both the housing 810 and shield 910 relative to the sheet metal 1210.

As a person skilled in the art will readily appreciate, the above description is meant as an illustration of the principles of this application. This description is not intended to limit the scope or application of the claim in that the assembly is susceptible to modification, variation and change, without departing from spirit of this application, as defined in the following claims.

What is claimed is:

1. A mountable sensor assembly for mounting on sheet metal of a vehicle, the sheet metal having an opening for mounting the mountable sensor assembly, the mountable sensor assembly comprising:
   a sensor circuit;
   a housing comprising a cavity that receives the sensor circuit; and
   a shield that engages the housing in a preassembled condition,
   wherein the housing slidably moves to lock the housing relative to the shield in a final assembly condition such that the slidable movement of the housing relative to the shield is configured for interlocking into the opening of the sheet metal.

2. The mountable sensor assembly according to claim 1, wherein the shield includes a slot and the housing includes an assembly arm that is received into the slot through an opening in the slot.

3. The mountable sensor assembly according to claim 1, wherein a locking mechanism in the shield engages the housing to prevent the housing from sliding relative to the shield when in an extended position.

4. The mountable sensor assembly according to claim 1, wherein a locking mechanism in the housing engages the shield to prevent the housing from sliding relative to the shield when in an extended position.

5. The mountable sensor assembly according to claim 4, wherein the housing includes a connector that extends through a connector opening in the shield, and the connector includes a locking mechanism that engages an outer surface of the shield to prevent the housing from sliding relative to the shield when in the extended position.

6. The mountable sensor assembly according to claim 1, wherein the housing comprises a first engaging member configured to engage an edge of the opening in the sheet metal and the shield includes a second engaging member configured to engage an opposite edge in the opening in the sheet metal.

7. The mountable sensor assembly according to claim 6, wherein the first engaging member is a pressure hook providing access to the cavity.

8. The mountable sensor assembly according to claim 7, wherein the second engaging member is a guiding tab.

9. The mountable sensor assembly according to claim 1, wherein the shield includes a pressing surface extended from the shield.

10. A mountable sensor assembly for mounting on sheet metal of a vehicle, the sheet metal having an opening for mounting the mountable sensor assembly, the mountable sensor assembly comprising:
    a sensor circuit;
    a housing comprising a cavity that receives the sensor circuit; and
    a shield that slidably interacts with the housing to lock the housing relative to the shield thereby engaging the opening in the sheet metal,
    wherein the shield includes a slot and the housing includes an assembly arm that is received into the slot through an opening in the slot, and
    wherein the assembly arm slides across the slot to move the housing relative to the shield into an extended position.

11. The mountable sensor assembly according to claim 10, wherein a locking mechanism in the slot engages the arm to prevent the housing from sliding relative to the shield when in the extended position.

12. A mountable sensor assembly for mounting on sheet metal of a vehicle, the sheet metal having an opening for mounting the mountable sensor assembly, the mountable sensor assembly comprising:
    a sensor circuit; and
    a sensor housing assembly comprising a first portion with a cavity that receives the sensor circuit and a second portion that engages the first portion in a preassembled condition,
    wherein the first portion slidably moves into a locked position relative to the second portion in a final assembly condition such that the slidable movement of the first portion is configured to lock the sensor housing assembly into the opening of the sheet metal.

13. The mountable sensor assembly according to claim 12, wherein the second portion linearly slides in a first direction along at least two surfaces of the first portion to expand a length of the sensor housing assembly.

14. The mountable sensor assembly according to claim 13, wherein the sensor housing assembly comprises a locking mechanism that prevents the first portion from sliding relative to the second portion to compress a length of the sensor housing assembly after the sensor housing has been expanded beyond a certain length.

15. The mountable sensor assembly according to claim 12, wherein the second portion includes a slot and the first portion includes an assembly arm that is received into the slot through an opening in the slot.

16. The mountable sensor assembly according to claim 12, wherein the first portion includes a connector that extends through a connector opening in the second portion, and the connector includes a locking mechanism that engages an outer surface of the second portion to prevent the first portion from sliding relative to the second portion when in an extended position.

17. The mountable sensor assembly according to claim 12, wherein the first portion comprises a first engaging member configured to engage an edge of the opening in the sheet metal and the second portion includes a second engaging member configured to engage an opposite edge in the opening in the sheet metal.

18. A mountable sensor assembly for mounting on sheet metal of a vehicle, the sheet metal having an opening for mounting the mountable sensor assembly, the mountable sensor assembly comprising:
    a sensor circuit; and
    a sensor housing assembly comprising a first portion with a cavity that receives the sensor circuit and a second portion that slidably interacts with the first portion to lock the sensor housing assembly into the opening in the sheet metal,
    wherein the second portion includes a slot and the first portion includes an assembly arm that is received into the slot through an opening in the slot, and
    wherein the assembly arm slides across the slot to move the first portion relative to the second portion into an extended position.

19. The mountable sensor assembly according to claim 18, wherein a locking mechanism in the slot engages the arm to prevent the first portion from sliding relative to the second portion when in the extended position.

20. A mountable sensor assembly for mounting on sheet metal of a vehicle, the sheet metal having an opening for mounting the mountable sensor assembly, the mountable sensor assembly comprising:
   a sensor circuit; and
   a sensor housing assembly comprising a first portion and a second portion in a preassembled condition, the first portion including a cavity that receives the sensor circuit and two assembly arms extending in opposite directions, the second portion including two slots, one slot being located on each side of the second portion and configured to receive an arm of the two assembly arms,
   wherein the first portion is slid relative to the second portion in a final assembly condition such that the sliding of the first portion relative to the second portion is configured to lock the sensor housing assembly into the opening of the sheet metal.

* * * * *